United States Patent
Goings et al.

(10) Patent No.: US 7,689,312 B2
(45) Date of Patent: Mar. 30, 2010

(54) DOWNSTREAM ERROR HANDLING IN MANUFACTURING SYSTEMS

(75) Inventors: Robert W. Goings, Longmont, CO (US); Dwight R. Palmer, Longmont, CO (US); Rodney L. Sherwood, Longmont, CO (US)

(73) Assignee: Infoprint Solutions Company, LLC, Boulder, CO (US)

( * ) Notice: Subject to any disclaimer, the term of this patent is extended or adjusted under 35 U.S.C. 154(b) by 1168 days.

(21) Appl. No.: 11/263,346

(22) Filed: Oct. 31, 2005

(65) Prior Publication Data

US 2007/0097409 A1 May 3, 2007

(51) Int. Cl.
G06F 19/00 (2006.01)
G05B 11/01 (2006.01)
G05B 19/42 (2006.01)
G06F 11/00 (2006.01)
G06K 15/00 (2006.01)

(52) U.S. Cl. ............ 700/110; 700/78; 700/80; 700/104; 700/108; 702/183; 702/185; 714/2; 714/5; 714/100; 358/1.12; 358/1.14

(58) Field of Classification Search ............ 700/21, 700/104, 108–110, 78, 80; 702/81–84, 183, 702/185; 714/2, 5, 100; 358/1.12–1.16, 358/2.1
See application file for complete search history.

(56) References Cited

U.S. PATENT DOCUMENTS

| | | | |
|---|---|---|---|
| 5,255,181 A * | 10/1993 | Chapman et al. | 705/8 |
| 5,262,797 A | 11/1993 | Boeller et al. | 346/1.1 |
| 5,905,857 A * | 5/1999 | Buzby et al. | 714/38 |
| 6,169,934 B1 * | 1/2001 | Nakayama et al. | 700/213 |
| 6,400,999 B1 * | 6/2002 | Kashiyama et al. | 700/100 |
| 6,407,821 B1 * | 6/2002 | Hohensee et al. | 358/1.15 |
| 6,453,430 B1 * | 9/2002 | Singh et al. | 714/47 |
| 6,538,760 B1 * | 3/2003 | deBry et al. | 358/1.15 |
| 7,076,317 B2 * | 7/2006 | Yamate et al. | 700/121 |
| 7,142,321 B2 * | 11/2006 | Tomita et al. | 358/1.15 |
| 7,180,623 B2 * | 2/2007 | Kato | 358/1.15 |
| 2002/0066386 A1 | 6/2002 | Douillard et al. | 101/483 |
| 2002/0182764 A1 * | 12/2002 | Heo et al. | 438/25 |
| 2002/0188653 A1 * | 12/2002 | Sun | 709/201 |
| 2004/0078105 A1 * | 4/2004 | Moon et al. | 700/100 |
| 2004/0190057 A1 * | 9/2004 | Takahashi et al. | 358/1.15 |
| 2004/0199281 A1 * | 10/2004 | Yamate et al. | 700/121 |
| 2006/0047454 A1 * | 3/2006 | Tamaki et al. | 702/84 |
| 2007/0121144 A1 * | 5/2007 | Kato | 358/1.14 |
| 2008/0104597 A1 * | 5/2008 | Smith et al. | 718/101 |

* cited by examiner

Primary Examiner—Ramesh B Patel
(74) Attorney, Agent, or Firm—Duft Bornsen & Fishman, LLP

(57) ABSTRACT

A method, computer program product, and system for handling an error that occurs during processing of a job in a manufacturing system are provided. The method, computer program product, and system provide for determining a first location in the job where a first subsystem of the manufacturing system is currently processing, identifying a second location in the job where a second subsystem of the manufacturing system completed processing before the error occurred at the second subsystem, the second subsystem being connected in series to and downstream from the first subsystem, and providing a controller-generated repositioning instruction for the first subsystem based on the first location and the second location.

28 Claims, 5 Drawing Sheets

DOWNSTREAM ERROR HANDLING IN MANUFACTURING SYSTEMS

FIELD OF THE INVENTION

The present invention relates generally to manufacturing systems. More particularly, the present invention is directed to handling of downstream errors in manufacturing systems.

BACKGROUND OF THE INVENTION

A manufacturing system consisting of multiple subsystems can be difficult to manage when an error occurs in a subsystem that is downstream from another subsystem that controls the input data. As an example, consider a document manufacturing system consisting of a continuous-forms printer with inline slitter, merger and stacker units, and an offline binding machine. If a paper jam occurs in the printer, the printer controller can restart printing with the sheet that was jammed once the jam has been cleared. However, if an error occurs later in the system, in the stacking unit or in the binding machine for example, the printer controller will not be aware of the sheet that caused the error or that an error even occurred. Instead, the printer controller may be actively printing a sheet that is hundreds of sheets beyond where the error occurred.

One solution to this problem requires an operator to cancel the job, discard all its sheets, and then reprint the full job. This is extremely wasteful of paper, toner, and other supplies. Another solution has the operator canceling the current job, retaining all sheets up to the error, creating and printing a new job with just the remaining sheets, and merging the original sheets with the sheets from the new job. Drawbacks of this solution are that it adds the complexity of a new print job and the problems associated with merging the new results with the old. In addition, many systems do not provide an easy way for an operator to create a new job containing only the remaining sheets.

A third solution requires the operator to manually calculate the number of sheets that have printed between the error sheet and the sheet currently printing at the printer and then instruct the printer controller to reset the print datastream to the error sheet position and begin printing again. This solution, however, requires an operator to perform a complicated calculation that is often too difficult for the operator to perform correctly, resulting in trial and error, which wastes materials and time.

Accordingly, there is a need for a way to address errors that occur downstream in a manufacturing system without requiring a new job to be created or an operator to guess where to restart the job, which results in excessive waste of time and materials. The present invention addresses such a need.

SUMMARY OF THE INVENTION

A method, computer program product, and system for handling an error that occurs during processing of a job in a manufacturing system are provided. The method, computer program product, and system provide for determining a first location in the job where a first subsystem of the manufacturing system is currently processing, identifying a second location in the job where a second subsystem of the manufacturing system completed processing before the error occurred at the second subsystem, the second subsystem being connected in series to and downstream from the first subsystem, and providing a controller-generated repositioning instruction for the first subsystem based on the first location and the second location.

By identifying the location in the job where the second subsystem completed processing before the error occurred, the loop between what the first subsystem has completed processing and where it needs to restart is closed. This not only reduces the amount of wasted time and material associated with canceling the job in its entirety and having to reprocess the whole job or requiring an operator to guess where to restart the job through trial and error, but it also decreases the complexity of creating a new job and the problems associated therewith.

Particular implementations can include a controller in the first subsystem to determine the first location in the job where the first subsystem is currently processing. In addition, a controller in the second subsystem can be included to identify the second location in the job where the second subsystem completed processing before the error occurred.

The manufacturing system can also include one or more additional subsystems connected in series to the first subsystem and the second subsystem. Each of the one or more additional subsystems may be upstream from the first subsystem, downstream from the second subsystem, or in between the first subsystem and the second subsystem.

In some embodiments, the manufacturing system is a document manufacturing system, the job is a print job, and a location in the job is a page in the print job. When the manufacturing system is a document manufacturing system, determining a first location in the job where the first subsystem is currently processing includes discovering a first page in the print job where the first subsystem is currently processing and identifying a second location in the job where the second subsystem completed processing before the error occurred includes locating a second page in the print job where the second subsystem completed processing before the error occurred. Each page in the print job may have a unique identifier.

In further embodiments, providing a controller-generated repositioning instruction for the first subsystem based on the first location and the second location includes generating a repositioning command for the first subsystem at a controller in a third subsystem of the manufacturing system based on the first location and the second location.

DETAILED DESCRIPTION

The present invention relates generally to manufacturing systems and more particularly to downstream error handling in manufacturing systems. The following description is presented to enable one of ordinary skill in the art to make and use the invention and is provided in the context of a patent application and its requirements. Various modifications to the preferred implementations and the generic principles and features described herein will be readily apparent to those skilled in the art. Thus, the present invention is not intended to be limited to the implementations shown, but is to be accorded the widest scope consistent with the principles and features described herein.

Figure 1:
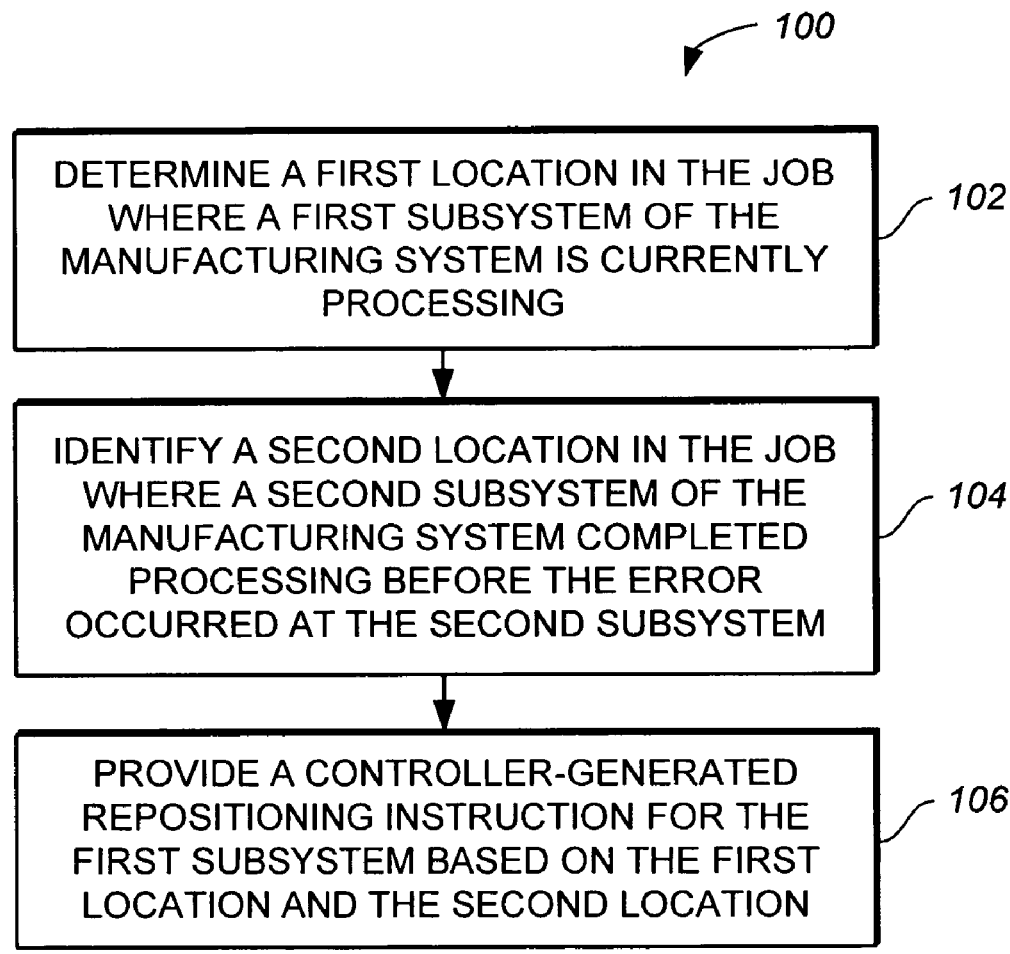
FIG. 1 is a process flow of a method for handling an error that occurs during processing of a job in a manufacturing system according to an aspect of the invention.

FIG. 1 depicts a process 100 for handling an error that occurs during processing of a job in a manufacturing system. At 102, a first location in the job where a first subsystem of the manufacturing system is currently processing is determined. A second location in the job where a second subsystem of the manufacturing system completed processing before the error occurred at the second subsystem is identified at 104. In the embodiment, the second subsystem is connected in series to and downstream from the first subsystem. A controller-generated repositioning instruction for the first subsystem is then provided based on the first location and the second location (106).

In one implementation, providing a controller-generated repositioning instruction for the first subsystem based on the first location and the second location includes generating a repositioning command for the first subsystem at a controller in a third subsystem of the manufacturing system based on the first location and the second location. The loop between what the first subsystem has completed processing and where it needs to restart is closed by identifying the location in the job where the second subsystem completed processing before the error occurred. This is less complex than having to create a new job and deal with the problems associated with merging the old and new results. Additionally, the amount of time and material wasted is reduced because the job does not need to be cancelled and reprocessed in its entirety and an operator does not need to guess a restarting point through trial and error.

Figure 2:
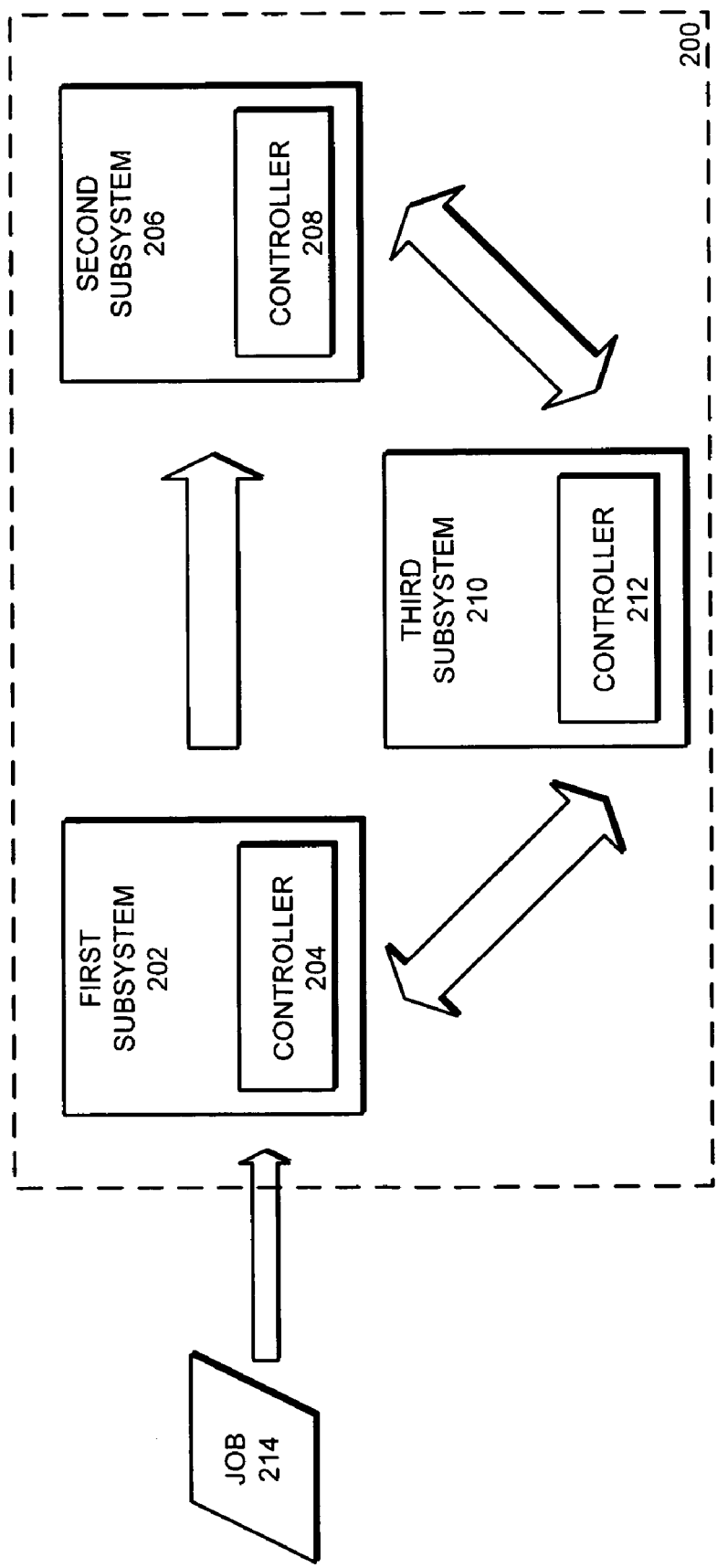
FIG. 2 illustrates a manufacturing system according to one embodiment of the invention.

Illustrated in FIG. 2 is a manufacturing system 200. Manufacturing system 200 includes a first subsystem 202 with a controller 204, a second subsystem 206 with a controller 208, and a third subsystem 210 with a controller 212. Second subsystem 206 is connected in series to and downstream from first subsystem 202. Third subsystem 210 is connected to be first subsystem 202 and second subsystem 206.

In the embodiment, a job 214 is submitted to manufacturing system 200. As first subsystem 202 completes processing each location, part, point, portion, or segment of job 214, for instance, a sheet of paper or a component, that segment of job 214 is passed to second subsystem 206 for further processing. In FIG. 2, any error that occurs on first subsystem 202 or second subsystem 206 will be detected by controllers 204 and 208, respectively. In other implementations, an error on subsystem 202 or 206 may be detected by third subsystem 210 or an operator (not shown) of manufacturing system 200.

When an error is detected in second subsystem 206 by controller 208, controller 208 may notify third subsystem 210 of the error. In response, third subsystem 210 may request controller 204 to determine a first location in job 214 where first subsystem 202 is currently processing and controller 208 to identify a second location in job 214 where second subsystem 206 completed processing before the error occurred. Controllers 204 and 208 can then forward that information to third subsystem 210.

Finding the first location and the second location may be accomplished by uniquely identifying each location in job 214. For example, a barcode may be used to identify each location. By incorporating a barcode scanner into subsystems 202 and 206, subsystems 202 and 206 can scan the barcode on each location in job 214 as the location is processed.

In other embodiments, after controller 208 detects an error in second subsystem 206, controller 208 could identify the second location in job 214 where second subsystem 206 completed processing before the error occurred and send that information along with the error notification to third subsystem 210.

Determining the first location and identifying the second location can also be accomplished manually. For instance, if each location in job 214 has a unique identifier associated with it, such as a barcode or a number, an operator can scan the barcode or input the number of the first location in job 214 where first subsystem 202 is currently processing and the second location in job 214 where second subsystem 206 completed processing before the error occurred through a scanner, keypad, or some other input device. In addition, the operator can directly input the first and second locations in job 214 directly into third subsystem 210.

Knowing the first and second locations allows third subsystem 210 to provide a controller-generated repositioning instruction for first subsystem 202. If first subsystem 202 is still processing job 214, it will be paused and then restarted at a location in job 214 where the error occurred in second subsystem 206 using the repositioning instruction from third subsystem 210. In another aspect of the invention, controller 212 in third subsystem can generate a repositioning command for first subsystem 202 based on the first location and the second location. This reposition command can then be used to restart first subsystem 202.

Figure 3:
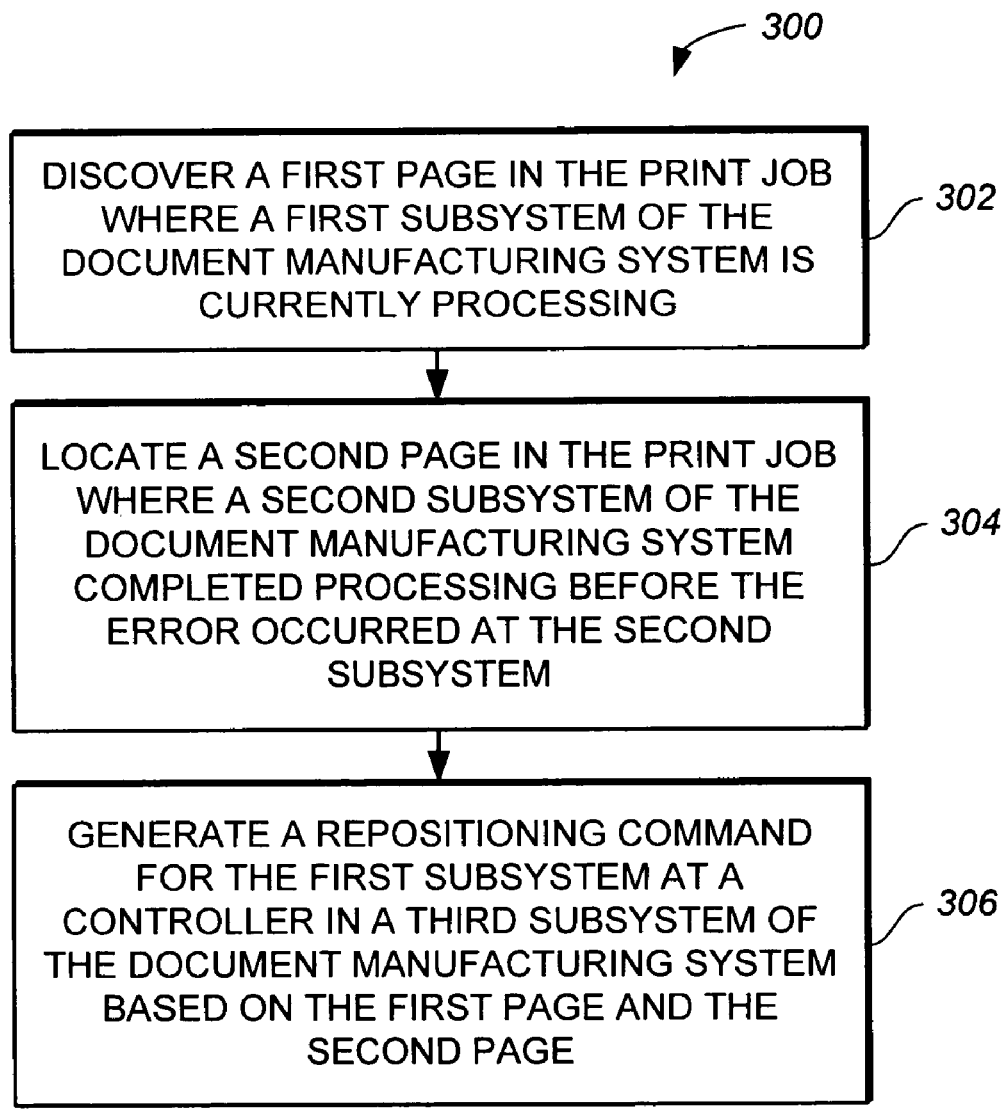
FIG. 3 depicts a flowchart of a method for handling an error that occurs during processing of a print job in a document manufacturing system according to an implementation of the invention.

FIG. 3 shows a process 300 for handling an error that occurs during processing of a print job in a document manufacturing system. At 302, a first page in the print job where a first subsystem of the document manufacturing system is currently processing is discovered. A second page in the print job where a second subsystem of the document manufacturing system completed processing before the error occurred at the second subsystem is located at 304. A repositioning command for the first subsystem is then generated at a controller in a third subsystem of the document manufacturing system based on the first page and the second page (306).

In an implementation of the invention, each page in the print job has a unique identifier, such as a barcode or a number. Since some document manufacturing systems may print multiple pages on one sheet of paper, for example, two pages side-by-side on a single sheet of paper, the repositioning command generated may instruct the first subsystem to restart from a specific sheet in the print job rather than from a specific page. And although process 300 has been described in terms of a document manufacturing system, the present invention is applicable to any manufacturing system with multiple subsystems, such as a component manufacturing system, a device manufacturing system, a food manufacturing system, or a clothing manufacturing system.

Figure 4:
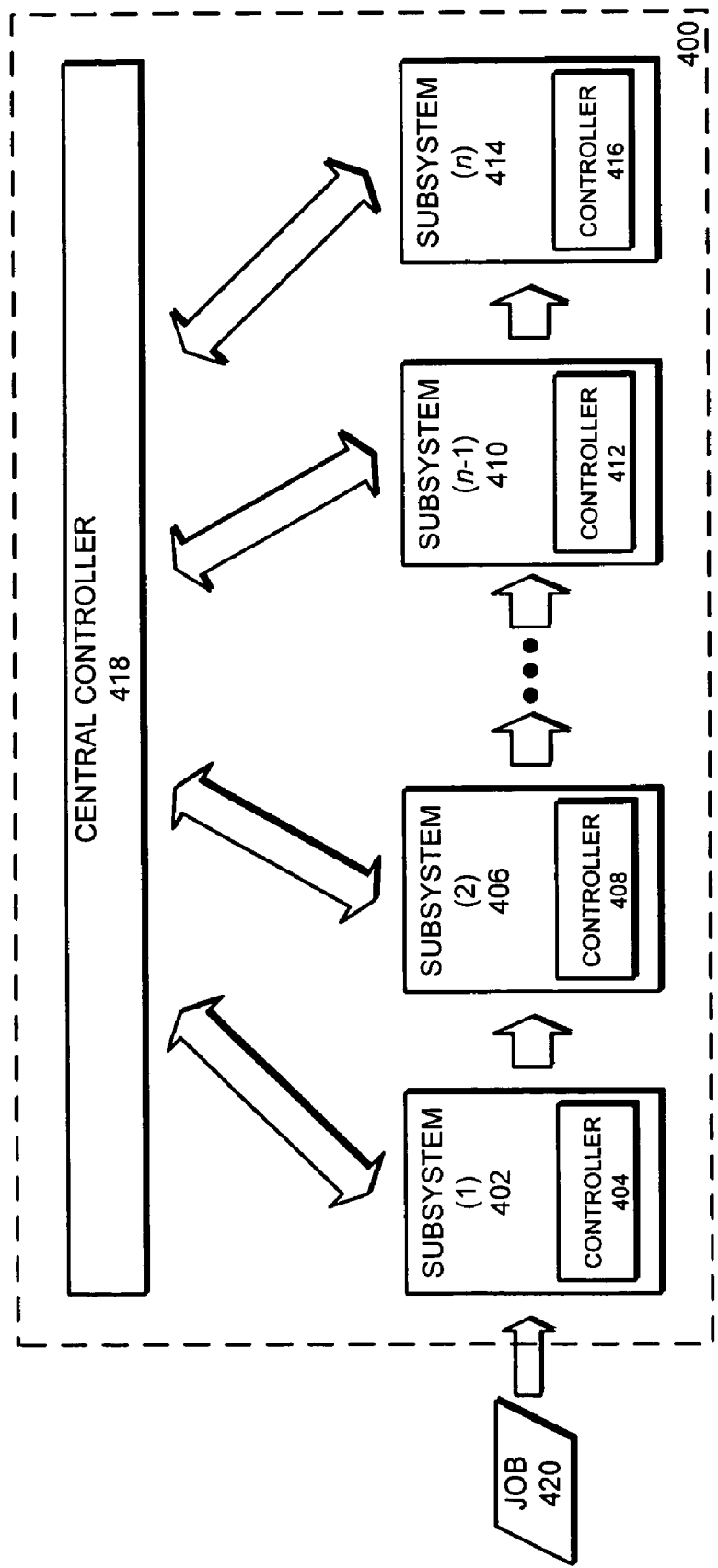
FIG. 4 shows a manufacturing system according to another embodiment of the invention.

Depicted in FIG. 4 is a manufacturing system 400. Manufacturing system 400 includes n number of subsystems and a central controller 418. Only subsystem (1) 402 with controller 404, subsystem (2) 406 with controller 408, subsystem (n−1) 410 with controller 412, and subsystem n 414 with controller 416 are shown. In the embodiment, the n number of subsystems are connected in series.

When a job 420 is submitted to manufacturing system 400, subsystem (1) 402 begins processing job 420. As subsystem (1) 402 finishes processing a portion of job 420, that portion is forwarded along to subsystem (2) 406 for further processing. And as subsystem (2) 406 finishes processing that portion, subsystem (2) 406 forwards it along to the next subsystem and so forth until that portion of job 420 reaches subsystem (n) 414 for final processing.

In the implementation of FIG. 4, central controller 418 monitors all of the subsystems in manufacturing system 400.

Thus, if an error occurs on subsystem (n−1) 410, it can detect the error and decide which subsystem upstream from subsystem (n−1) 410 needs to be repositioned in light of the error. Once central controller 418 decides which upstream subsystem needs to be repositioned, it will request the controller of that subsystem to determine a first location in job 420 where the subsystem is currently processing.

For instance, if central controller 418 decides that subsystem (2) 406 has to be repositioned as a result of the error that occurred on subsystem (n−1) 410, it can request controller 408 to determine a first location in job 420 where subsystem (2) 406 is currently processing and controller 412 to identify a second location in job 420 where subsystem (n−1) 410 completed processing before the error occurred. Central controller 418 can then provide a repositioning instruction for subsystem (2) 406 based on the first and second locations.

Thereafter, subsystem (2) 406 can restart job 420 at the location where the error occurred in subsystem (n−1) 410. If any of the subsystems in manufacturing system 400 were still processing job 420 when the error occurred, those subsystems may need to be paused before restarting job 420 at subsystem (2) 406. Additionally, error detection, in other embodiments, may still be left up to the individual controllers in each subsystem. Thus, the individual controllers may automatically find the location in job 420 where the particular subsystem completed processing before the error occurred and then forward that information to central controller 418.

The invention can take the form of an entirely hardware embodiment, an entirely software embodiment, or an embodiment containing both hardware and software elements. In one aspect, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk—read-only memory (CD-ROM), and compact disk—read/write (CD-R/W).

Figure 5:
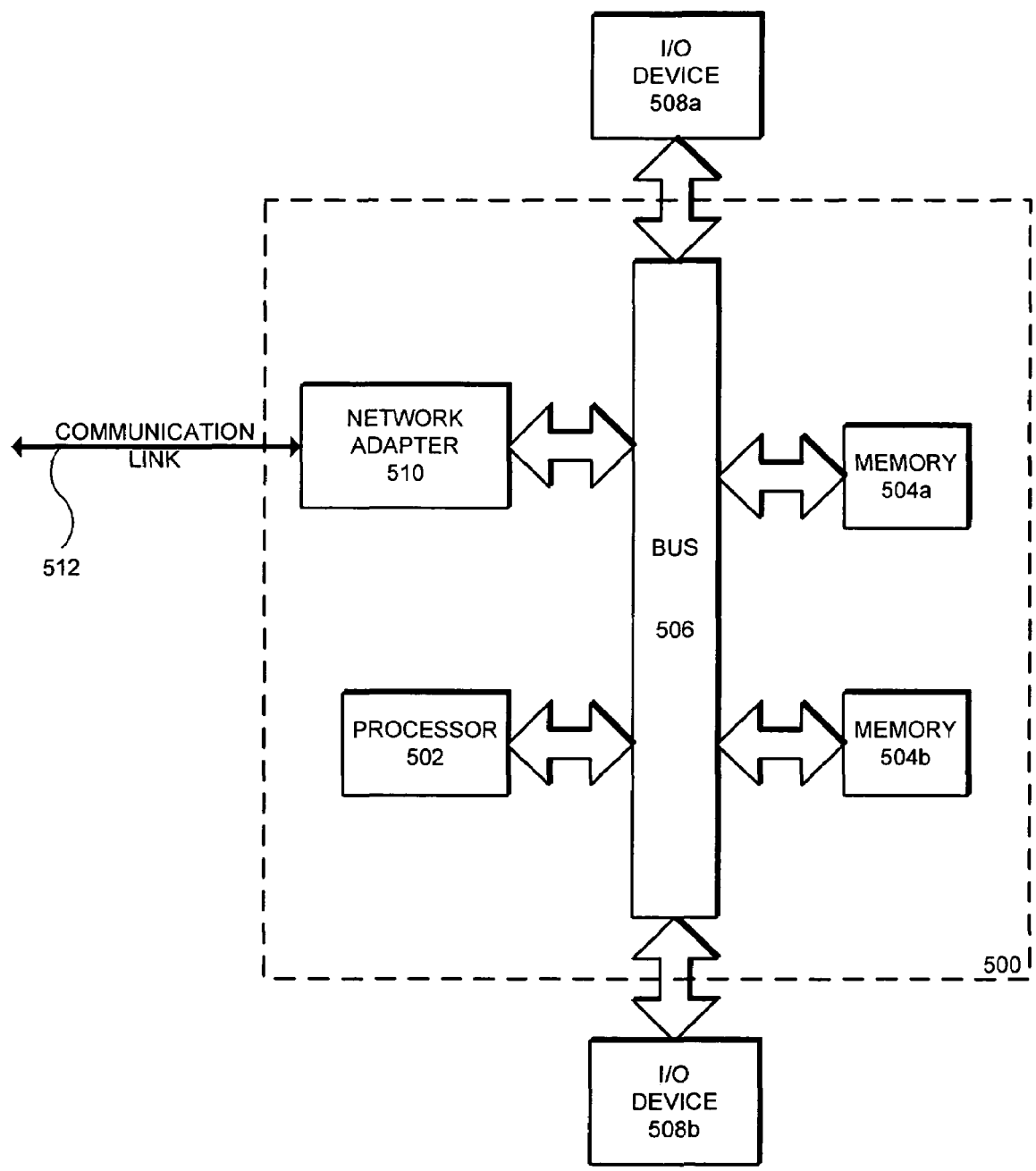
FIG. 5 is a block diagram of a data processing system with which embodiments of the present invention can be implemented.

FIG. 5 illustrates a data processing system 500 suitable for storing and/or executing program code. Data processing system 500 includes a processor 502 coupled to memory elements 504a-b through a system bus 506. In other embodiments, data processing system 500 may include more than one processor and each processor may be coupled directly or indirectly to one or more memory elements through a system bus.

Memory elements 504a-b can include local memory employed during actual execution of the program code, bulk storage, and cache memories that provide temporary storage of at least some program code in order to reduce the number of times the code must be retrieved from bulk storage during execution. As shown, input/output or I/O devices 508a-b (including, but not limited to, keyboards, displays, pointing devices, etc.) are coupled to data processing system 500. I/O devices 508a-b may be coupled to data processing system 500 directly or indirectly through intervening I/O controllers (not shown).

In the embodiment, a network adapter 510 is coupled to data processing system 500 to enable data processing system 500 to become coupled to other data processing systems or remote printers or storage devices through communication link 512. Communication link 512 can be a private or public network. Modems, cable modems, and Ethernet cards are just a few of the currently available types of network adapters.

Various implementations for handling downstream errors in manufacturing systems have been described. Nevertheless, one of ordinary skill in the art will readily recognize that various modifications may be made to the implementations, and any variations would be within the spirit and scope of the present invention. For example, the above-described process flows are described with reference to a particular ordering of process actions. However, the ordering of many of the described process actions may be changed without affecting the scope or operation of the invention. Accordingly, many modifications may be made by one of ordinary skill in the art without departing from the spirit and scope of the following claims.

What is claimed is:

1. A method of handling an error that occurs during processing of a job in a manufacturing system, the method comprising:

determining a first location in the job where a first subsystem of the manufacturing system is currently processing in response to detecting the error at a second subsystem;

identifying a second location in the job where the second subsystem of the manufacturing system completed processing before the error occurred at the second subsystem, the second subsystem being connected in series to and downstream from the first subsystem to process the second location after the first subsystem has completed processing the second location; and providing a controller-generated repositioning instruction for the first subsystem based on the first location and the second location to restart at a location in the job where the error occurred in the second subsystem.

2. The method of claim 1, wherein the manufacturing system comprises one or more additional subsystems connected in series to the first subsystem and the second subsystem, wherein each of the one or more additional subsystems is upstream from the first subsystem, downstream from the second subsystem, or in between the first subsystem and the second subsystem.

3. The method of claim 1, wherein a controller in the first subsystem determines the first location in the job where the first subsystem is currently processing.

4. The method of claim 1, wherein a controller in the second subsystem identifies the second location in the job where the second subsystem completed processing before the error occurred.

5. The method of claim 1, wherein providing the controller-generated repositioning instruction for the first subsystem based on the first location and the second location comprises: generating a repositioning command for the first subsystem at a controller in a third subsystem of the manufacturing system based on the first location and the second location.

6. The method of claim 1, wherein the manufacturing system is a document manufacturing system, the job is a print job, and a location in the job is a page in the print job.

7. The method of claim 6, wherein determining the first location in the job where the first subsystem is currently processing comprises: discovering a first page in the print job where the first subsystem is currently processing.

8. The method of claim 6, wherein identifying the second location in the job where the second subsystem completed processing before the error occurred comprises: locating a second page in the print job where the second subsystem completed processing before the error occurred.

9. The method of claim 6, wherein each page in the print job has a unique identifier.

10. A computer program product comprising a computer readable medium, the computer readable medium including a computer readable program for handling an error that occurs during processing of a job in a manufacturing system, wherein the computer readable program when executed on a computer causes the computer to:
   determine a first location in the job where a first subsystem of the manufacturing system is currently processing in response to detecting the error at a second subsystem;
   identify a second location in the job where the second subsystem of the manufacturing system completed processing before the error occurred at the second subsystem, the second subsystem being connected in series to and downstream from the first subsystem to process the second location after the first subsystem has completed processing the second location; and
   provide a controller-generated repositioning instruction for the first subsystem based on the first location and the second location to restart at a location in the job where the error occurred in the second subsystem.

11. The computer program product of claim 10, wherein the manufacturing system comprises one or more additional subsystems connected in series to the first subsystem and the second subsystem, wherein each of the one or more additional subsystems is upstream from the first subsystem, downstream from the second subsystem, or in between the first subsystem and the second subsystem.

12. The computer program product of claim 10, wherein a controller in the first subsystem determines the first location in the job where the first subsystem is currently processing.

13. The computer program product of claim 10, wherein a controller in the second subsystem identifies the second location in the job where the second subsystem completed processing before the error occurred.

14. The computer program product of claim 10, wherein provide the controller-generated repositioning instruction for the first subsystem based on the first location and the second location comprises: generate a repositioning command for the first subsystem at a controller in a third subsystem of the manufacturing system based on the first location and the second location.

15. The computer program product of claim 10, wherein the manufacturing system is a document manufacturing system, the job is a print job, and a location in the job is a page in the print job.

16. The computer program product of claim 15, wherein determine the first location in the job where the first subsystem is currently processing comprises: discover a first page in the print job where the first subsystem is currently processing.

17. The computer program product of claim 15, wherein identify the second location in the job where the second subsystem completed processing before the error occurred comprises: locate a second page in the print job where the second subsystem completed processing before the error occurred.

18. The computer program product of claim 15, wherein each page in the print job has a unique identifier.

19. A manufacturing system comprising:
   a first subsystem operable to process a job;
   a second subsystem connected in series to and downstream from the first subsystem, the second subsystem being operable to process the job, wherein the second subsystem is further operable to process a portion of the job after the first subsystem completes processing the portion of the job; and
   one or more controllers operable to handle an error that occurs during processing of the job at the second subsystem, including:
      determine a first location in the job where the first subsystem is currently processing in response to detecting the error at the second subsystem;
      identify a second location in the job where the second subsystem completed processing before the error occurred at the second subsystem; and
      provide a controller-generated repositioning instruction for the first subsystem based on the first location and the second location to restart at a location in the job where the error occurred in the second subsystem.

20. The manufacturing system of claim 19, wherein at least one of the one or more controllers is a controller in the first subsystem.

21. The manufacturing system of claim 19, wherein at least one of the one or more controllers is a controller in the second subsystem.

22. The manufacturing system of claim 19, further comprising: at least one addition subsystem, the at least one additional subsystem being connected in series to the first subsystem and the second subsystem, wherein each of the at least one additional subsystem is upstream from the first subsystem, downstream from the second subsystem, or in between the first subsystem and the second subsystem.

23. The manufacturing system of claim 22, wherein at least one of the one or more controllers is a controller in the at least one additional subsystem.

24. The manufacturing system of claim 19, wherein the manufacturing system is a document manufacturing system, the job is a print job, and a location in the job is a page in the print job.

25. The manufacturing system of claim 24, wherein determine the first location in the job where the first subsystem is currently processing comprises: discover a first page in the print job where the first subsystem is currently processing.

26. The manufacturing system of claim 24, wherein identify the second location in the job where the second subsystem completed processing before the error occurred comprises: locate a second page in the print job where the second subsystem completed processing before the error occurred.

27. The manufacturing system of claim 24, wherein each page in the print job has a unique identifier.

28. The manufacturing system of claim 19, wherein provide the controller-generated repositioning instruction for the first subsystem based on the first location and the second location comprises: generate a repositioning command for the first subsystem at a controller in a third subsystem of the manufacturing system based on the first location and the second location.

* * * * *